United States Patent [19]

Basaglia et al.

[11] Patent Number: 4,476,827
[45] Date of Patent: Oct. 16, 1984

[54] PLANT FOR SUPPLYING DIESEL CYCLE ENGINES WITH DIESEL OIL AND WITH A MIXTURE OF DIESEL OIL AND GAS

[75] Inventors: Rubens Basaglia, Galliera; Ezio Bollina, Bologna, both of Italy

[73] Assignee: B & b Bologna di Basaglia Rubens e Bollina Ezio s.n.c., Bologna, Italy

[21] Appl. No.: 459,965

[22] Filed: Jan. 21, 1983

[30] Foreign Application Priority Data

May 20, 1982 [IT] Italy ............................. 3249 A/82
Oct. 15, 1982 [IT] Italy ............................. 3561 A/82

[51] Int. Cl.³ ............................................... F02B 3/00
[52] U.S. Cl. ............................... 123/276; 123/525; 123/526
[58] Field of Search ............... 123/525, 526, 276 E

[56] References Cited

U.S. PATENT DOCUMENTS

| | | | |
|---|---|---|---|
| 2,315,882 | 4/1943 | Trimble et al. | 123/525 |
| 2,544,978 | 3/1951 | Blessing et al. | 123/526 |
| 2,569,002 | 9/1951 | Holloway et al. | 123/526 |
| 2,690,167 | 9/1954 | Moulton | 123/526 |
| 2,865,164 | 12/1958 | Kauffmann | 123/27 GE |
| 2,895,462 | 7/1959 | Champ | 123/525 |
| 2,987,055 | 6/1961 | Grauel et al. | 123/27 GE |
| 3,718,000 | 2/1973 | Walker | 123/525 |
| 4,125,091 | 11/1978 | Hori | 123/525 |

FOREIGN PATENT DOCUMENTS

| | | | |
|---|---|---|---|
| 960643 | 4/1950 | France | 123/526 |
| 170906 | 3/1960 | Sweden | 123/526 |
| 918483 | 4/1982 | U.S.S.R. | 123/525 |

*Primary Examiner*—Donald B. Cox
*Attorney, Agent, or Firm*—Cushman, Darby & Cushman

[57] ABSTRACT

Disclosed herein is a plant that supplies a diesel oil-gas fuel mixture to diesel cycle engines and comprises: a device for interrupting the travel of the lever that controls the injection pump and is connected to the accelerator; and a mixer group placed along the manifold for the induction of air to the cylinders, comprising two separate parallel pipes, the first of which provided with a first throttle valve movable between two extreme positions, namely a position for opening the air passage when the engine is running on diesel oil and a position for closing the air passage when the engine is running on a mixture of diesel oil and gas, and the second of which provided with a Venturi tube and with a second throttle valve for blocking the air passage, movable continuously and connected to the accelerator, the said Venturi tube being connected to a pipe for the supply of the gas at low pressure; the said pipes being jointly provided with an air passage area at least identical to that required for maximum engine air induction.

14 Claims, 8 Drawing Figures

PLANT FOR SUPPLYING DIESEL CYCLE ENGINES WITH DIESEL OIL AND WITH A MIXTURE OF DIESEL OIL AND GAS

BACKGROUND OF THE INVENTION

The invention relates to a plant for supplying diesel cycle engines with diesel oil and with a mixture of diesel oil and gas.

DESCRIPTION OF THE PRIOR ART

The problem of supplying a diesel cycle engine with a diesel oil-gas fuel mixture has been under study ever since the time when the said engine first came to light, even, so it would seem, on the part of Rudolf Diesel himself, though it has never led to any practical solution that could be adopted with a certain continuity or with any given positive results, especially in the field of self-propelled commercial vehicles.

In the case of a mixed supply, instead of air alone being induced, the charge consists of a mixture of air and gas suitable for achieving the carburation of the former, while in the return stroke the mixture is compressed and, just before the compression stage ends, a small quantity of diesel oil is injected, through the usual pump-injectors group, into the combustion chamber.

Since the characteristics of the gas utilized are such that the compression temperature of the mixture stays below the self-ignition temperature, what happens is that the diesel oil ignites and the consequent rise in temperature contributes, in turn, towards the ignition of the mixture.

The essential task of the diesel oil is, therefore, to occasion, through its own spontaneous ignition, the combustion of the compressed mixture: in practice, the diesel oil replaces the spark plug used in conventional combustion engines.

SUMMARY OF THE INVENTION

The main object of the invention consists in constructing a plant for supplying a diesel oil-gas fuel mixture that can be fitted to normal diesel cycle engines and is able to adapt them for dual operation in which they are supplied with diesel oil by itself or with a mixture of diesel oil and gas, with the changeover from one condition to the other made extremely fast, without the need to alter technically the original plant, and with efficiency results comparable one with respect to the other.

Another object of the invention consists in constructing a plant that utilizes a limited number of conversion devices and groups so concentrated as to reduce the overall dimensions and the times the engine has to be handled while the transformation operation is in progress.

A further object of the invention consists in constructing a plant that utilizes special devices through which it is possible to constantly vary and regulate, in extremely short intervals of time, the travel value for the operation of the injection pump and the gas induction values suitably with the characteristics and the controls of the various means to which the said plant is fitted; all this being achieved using methods that are extremely compact and functional.

These and other objects too are all attained by the plant forming the subject of the invention that comprises: a device for interrupting the travel of the lever that controls the injection pump and is connected to the accelerator; and a mixer group placed along the manifold for the induction of air to the cylinders, comprising two separate parallel pipes, the first of which provided with a first throttle valve movable between two extreme positions, namely a position for opening the air passage when the engine is running on diesel oil and a position for closing the air passage when the engine is running on a mixture of diesel oil and gas, and the second of which provided with a Venturi tube and with a second throttle valve for blocking the air passage, movable continuously and connected to the accelerator control, the said Venturi tube being connected to a pipe for the supply of the gas at low pressure; the said pipes being jointly provided with an air passage area at least identical to that required for maximum engine air induction.

BRIEF DESCRIPTION OF THE DRAWINGS

Further characteristics and advantages of the plant forming the subject of the invention will become more apparent from the detailed description that follows, illustrated purely as an unlimited example on the accompanying drawings, in which:

FIG. 6 shows, in a view along the axial section VI—VI in FIG. 5, the mixer group;

DESCRIPTION OF THE PREFERRED EMBODIMENT

Figure 1:
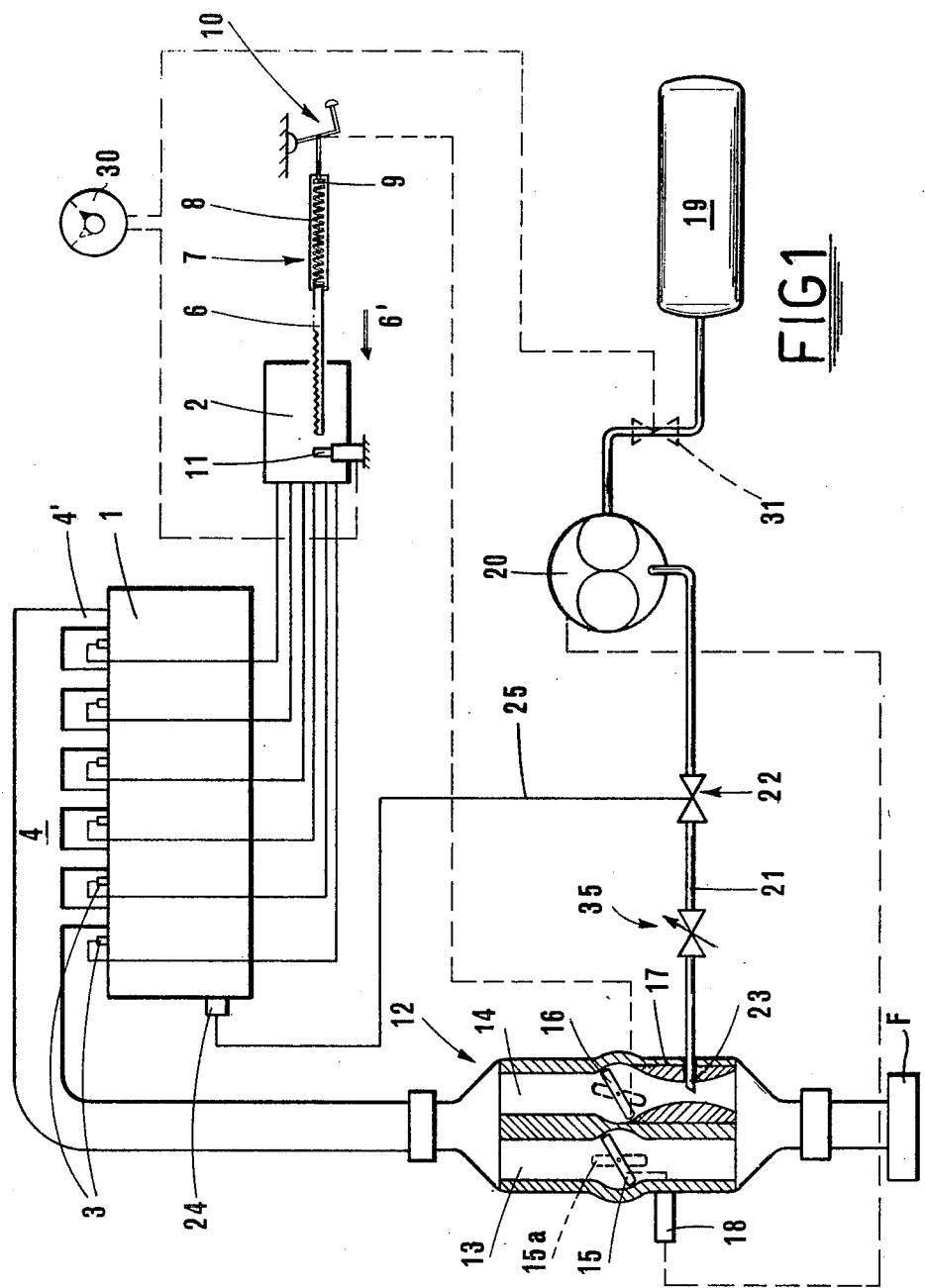
FIG. 1 shows, in a diagrammatic view, the plant according to the invention.

With reference to FIG. 1, shown at 1 is an ordinary diesel type engine which, when running, draws in air that is directed, via a manifold 4 and the branched pipes 4', to the various cylinders, and is supplied with diesel oil through a number of injectors 3, all of which belong to an injection pump 2, of a known type, whose operation is controlled, through a rod 6 provided for this purpose, by the means that operate the accelerator 10. In the diagrammatic representation that has been used, interposed between the lever for operating the accelerator 10 and the rod for controlling the injection pump 6 there is a device for limiting the travel of the said rod, constituted by a container 7 inside which is provided a spring 8 that exerts an effect on a piston 9 which, in turn, is directly connected to the accelerator 10.

The action on the accelerator 10 determines, through the said spring 8 which is of a certain consistence, a corresponding translation of the control rod 6 in the direction shown at 6' and this continues until the movement is impeded by a stop 11 more about which will be said in due course.

The air induction manifold 4 that normally terminates solely at the air filter F shown in the figures, is interrupted through the interpositioning of a mixer group 12 constituted by two pipes 13 and 14 that are placed separately, in parallel, one at the side of the other on the induction manifold 4, the former provided with a throttle valve 15 and the latter with a throttle valve 16.

The first pipe 13 is unimpeded, that is to say, air can pass freely inside the pipe, and the throttle valve 15 is movable, under the action of a piston 18, between two extreme positions, namely the position in which the valve 15 is depicted, close to blocking the passage area in the entire pipe, and the position shown at 15a in a broken line, in which the passage area is open and air is completely free to pass in the inside of the said pipe.

The second pipe 14 has in it, instead, upstream of the throttle valve 16 which is free to rotate in continuation between two extreme open and closed positions similar to those of the previously mentioned pipe 13, and is directly connected to the action of the accelerator 10, a choke in the form of a Venturi tube, into the region of which, inside the said pipe 14, runs the extremity 23 of a pipe 21 that is connected to the low pressure outlet of a pressure reducer 20 whose high pressure inlet is connected to the gas tank 19 (or to a constant source of supply).

In this way, in the pipe 14, when the throttle valve 16 adopts any intermediate position whereby the cylinders be allowed to draw in air, a vacuum is created inside the Venturi tube 17 such as to draw in, through the pipe 21 a quantity of gas corresponding to the amount that is needed. By means of an adjustable valve 35 to be positioned on the pipe 21, it is possible to regulate the flow of gas.

Again with reference to FIG. 1, shown at 24 is a device for metering the number of revolutions of the engine, preferably of electronic type, which checks the number of revolutions completed and once a predetermined limit has been exceeded, operates a blocking valve 22 placed along the line delivering gas to the mixer group, or better still inside the said reducer, which shuts off the supply of gas to the inside of the Venturi tube 17.

The foregoing has been given purely as an indication. In one preferred embodiment, illustrated in FIG. 2, the mixer group 12 also comprises the device 10' for limiting the travel of the rod 6 of the injection pump, the operation of which is controlled, through an intermediate element 6a-6b (commonly a metal cable), by the operation of the accelerator 10.

The mixer group 12 is positioned, by means of flanges 12a, along the said air induction manifold 4, and it is constituted by two concentric tubular bodies that define the two separate and distinct pipes 13 and 14 placed, one parallel with the other, on the induction manifold 4, each of which is provided with the said throttle valves 15 and 16 (of quarter moon conformation), respectively.

In the first pipe 13, the throttle valve 15 is movable under the action of a piston or an electromagnetic device 18 which moves a cam 18' fixedly mounted on the throttle valve support shaft 18" between the two extreme positions 15 and 15a depicted in FIG. 6.

As regards the second pipe 14, what was stated previously applies.

The operation of the accelerator 10, as has been stated, indirectly moves the rod 6 that controls the injection pump and the throttle valve 16 of the Venturi tube, through the said limiting device 10'.

Figure 3:
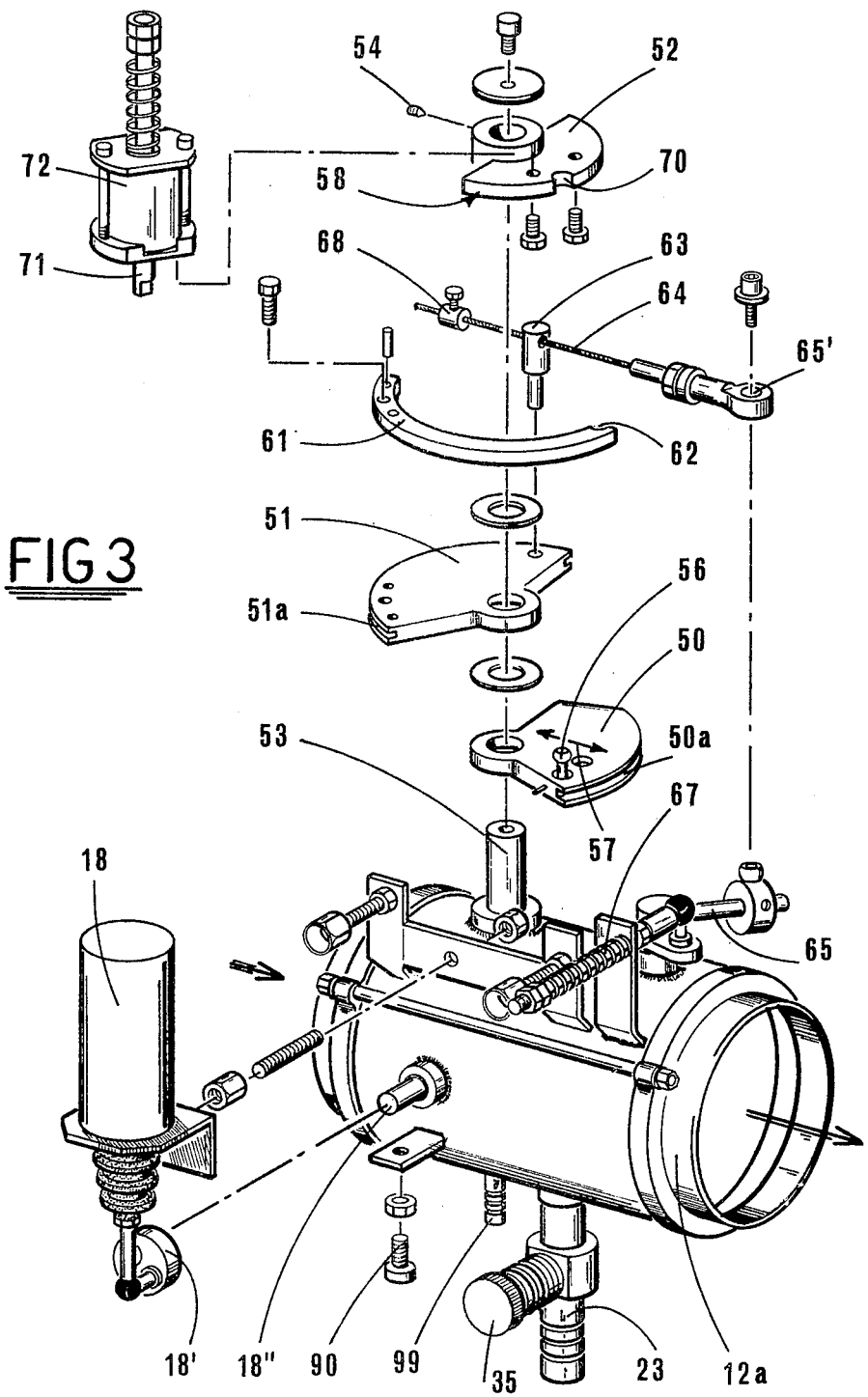
FIG. 3 shows, in an exploded view, the mixer group illustrated in FIG. 2.

The latter, see in particular FIG. 3, is constituted by three disks 50, 51 and 52 (or rather by three part disks) that are coaxial one with the other and are superposed one over the other, that is to say, extend in three separate planes, as can be seen in FIG. 6. The disks 50 and 51 are idly pivoted to the vertical spindle 53, while the disk 52 can be fixed thereto, in the required predetermined angular position, by means of a pair of dowels 54. As will be seen, the angular position determines the various points at which the travel of the injection pump can be interrupted.

The first disk 50 is connected, through a flexible cable 6a, to the rod 6 of the injection pump, while the second disk 51 is connected, by means of a similar flexible cable 6b, to the control means of the accelerator 10. Both the cables 6a and 6b are guided and contained in corresponding grooves 50a and 51a machined in the external circumferential surface of the corresponding disks.

The first disk 50 is provided with a pawl 56 that projects from its upper surface and is pivoted to the said disk in a way whereby it is able to undergo displacements in a radial direction, as shown by the arrow 57. The said pawl is of a height and is so positioned as to be able to go flush up against the external circumferential surface 58 of the third disk 52.

Figure 4:
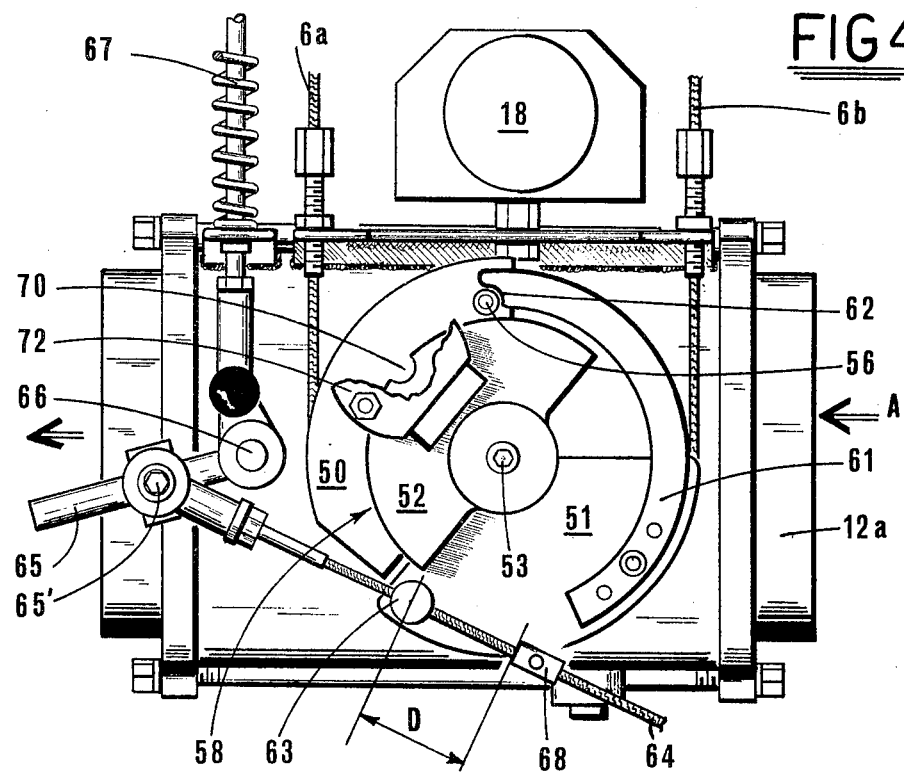
FIG. 4 shows, in a plan view, the mixer group.
Figure 5:
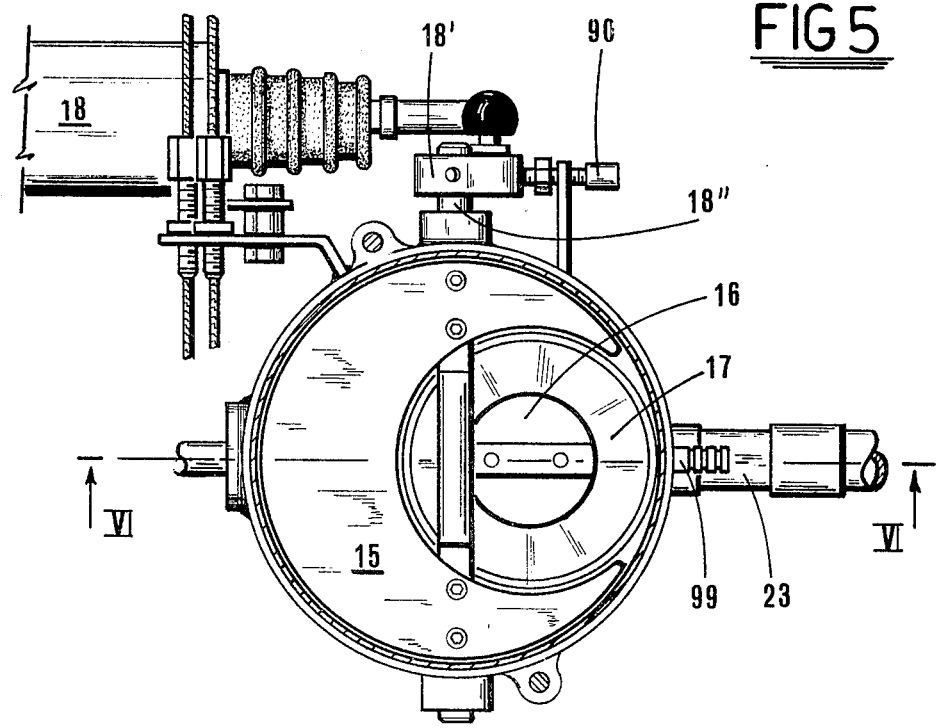
FIG. 5 shows, in a view from A in FIG. 4, the mixer group.
Figure 7:
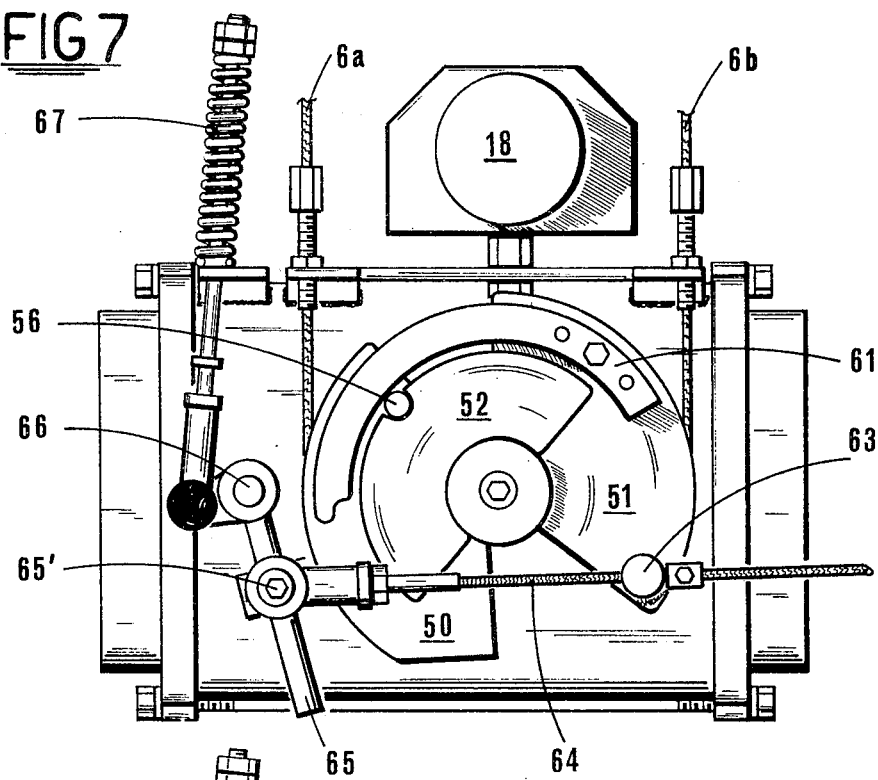
FIGS. 7 and 8 show, in plan views, the mixer group in two different working stages.
Figure 8:
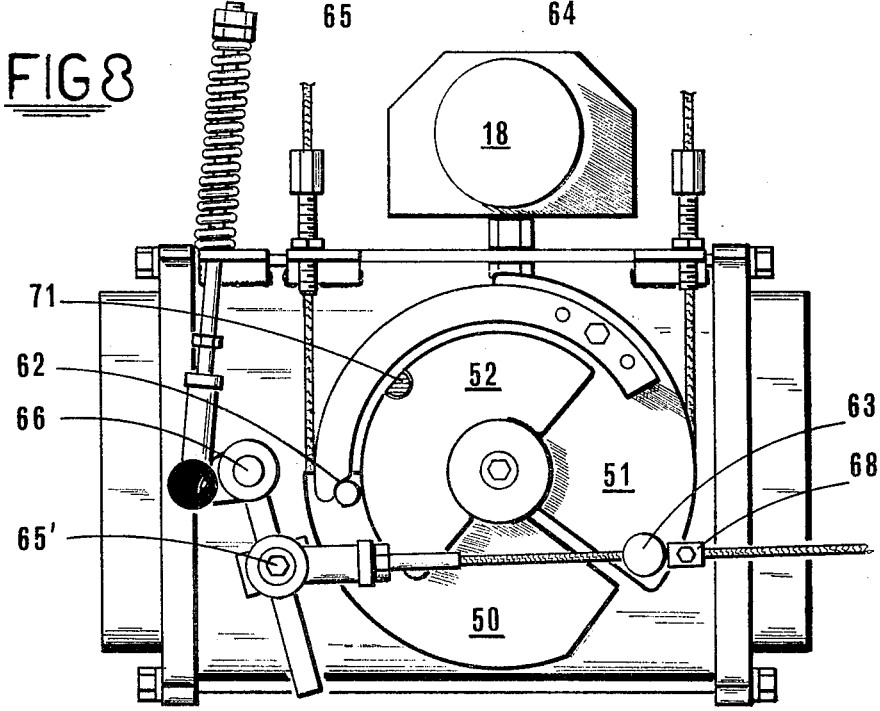

In turn, the second disk 51 is provided with an integral circular sector end piece 61 that can be positioned with respect to the said disk 50. The said end piece extends in a horizontal plane (see FIG. 4) externally to the third disk 52 and has at its free extremity a recess 62 designed to couple with the said pawl 56.

Furthermore, the said second disk 51 is provided with a radially drilled projecting pin 63, inside the hole 63' of which a cable 64 that moves, through an intermediate leverage 65, the support shaft 66 of the second Venturi tube throttle valve 16, is made to pass. A spring 67 serves as the elastic return element for the travel of the said throttle valve, while the locking of the cable 64 is effected by means of a sleeve 68 tightly around the cable at a distance D that is variable for reasons that will be seen below.

The third disk 52 is provided circumferentially with a seat 70 of a size corresponding to the head of the pawl 56, inside which this can partially be restrained while rotating radially around its fulcrum point. The said seat 70 can be closed, in such a way as to have a return to the original circumference of the disk 52, by the rod 71 of an electromagnet 72 fastened to the upper part of the said third disk 52 and operated by the control group for changing over from diesel oil to a mixture of diesel oil and gas.

A brief description will now be given of the operation of the engine in accordance with what is outlined in FIG. 1.

When the cab changeover switch 30 is placed in the diesel oil position, the piston 18, moved for example by a spring housed internally in it, positions the throttle valve 15 in the fully open position that can be seen in broken line form at 15a. Contemporaneously, the blocking valve 31, placed out of preference on the line delivering high pressure gas from the tank to the reducer, remains closed and, therefore, out of operation. The engine is, in this way, perfectly free to run in accordance with its diesel cycle since the control rod 6, unimpeded by the stop device 11, is free to effect its full travel so, therefore, as to cause the injectors 3 to force into the combustion chamber the required quantity of diesel oil, which can vary between the minimum and maximum engine value; the maximum value is determined by the rotating masses that limit the number of revolutions of the engine.

At this stage, the quantity of air required by the engine will be freely induced by the pistons of the engine since there is an unrestrained passage inside the pipe 13, which as stated is open, and inside the pipe 14 since the means for controlling the accelerator 10 move the valve in whichever direction they themselves move. It is obvious that in this configuration the passage area of the two pipes, with the valves in the maximum open condition, will have been calculated in such a way as to allow an intake of air at least identical to the maximum engine requirements.

On account of the fact that the engine is running on diesel oil and thus draws in whatever air is required, it is possible, in this case, to have a larger area for the pipe 13 since with there being no upstream mixing, only the necessary quantity of air will be induced.

If, instead, it is wished to supply the engine with a diesel oil-gas fuel mixture, the cab changeover switch 30 seen in the figures has to be appropriately positioned. With the changeover, the device for limiting the travel of the rod controlling the injection pump is brought into operation, the high pressure valve 31 opens and the piston 18 is set in operation to place the throttle valve 15 in a position close to blocking, though leaving sufficient a passage to supply the engine when it is slow running and thus operates only on diesel oil. The said piston 18 should, preferably, be directed connected to the low pressure output of the gas reducer 20 so that just by opening the valve 31 and thus the admittance of gas to the inside of the said reducer 20, the operation of the piston 18 be occasioned.

Under the circumstances, therefore, the control rod 6 is no longer able to fully complete its travel but merely a small initial travel such as to allow a minimum quantity of diesel oil to be injected inside the cylinders, sufficient to keep the engine in an idling state. Percentage wise it can be said that the amount of diesel oil injected is the minimum quantity that suffices to guarantee the perfect ignition of the air-gas mixture at any rating of the engine: it depends on the maximum pressure the injection pump can reach with the minimum quantity of diesel oil.

Thus when continuing, in this way, to operate the control means of the accelerator 10 and since the rod 6 is no longer able to pursue its movement, the compression will take place of the spring 8 which thus acts as an intermediate elastic element, while the rotation of the accelerator 10, through the said connection with the throttle valve 16 which will always be maintained, will cause the partial, continuous or total opening of the valve 16 which, in this way, will serve as the air-gas mixer element since, as a result of the vacuum forming in the inside of the Venturi tube 17, a quantity of gas corresponding to the value required by the engine will be drawn in.

Naturally, the delivery of low pressure gas will be preset so as to be able to fully satisfy the requirements of the engine, which will be mainly supplied through the mixture of air and gas that constitutes the predominant combustion element, while the small percentage of diesel oil will, instead, act solely, as stated previously in the introductory part of this text, as the element for igniting the said mixture.

In order to prevent the engine from experiencing most harmful periods of runaway speed when running on a diesel oil-gas fuel mixture, since in this instance there are no rotating masses to define and limit the number of revolutions, the sensor element 24 will be brought into operation to "read" the number of revolutions reached by the engine and, once a predetermined value has been attained, to cut off the supply to the valve 22 which, by closing, will prevent the engine from drawing in any further quantity of gas and, in this way, will thus limit the operation of the entire engine.

With reference now, instead, to FIGS. 2-8, when the cabin changeover switch 30 is placed in the diesel oil position, the electromagnet 18 positions the valve 15 in the open configuration 15a, while the valve 31 is closed.

Contemporaneously, the electromagnet 72 positions its rod 71 in the seat 70 closed condition. In this way, the engine is perfectly free to run in accordance with its diesel cycle since the control means of the accelerator 10 cause a pull to be applied to the cable 6b and with this, a rotation on the disk 51 whose end piece 61, by moving the pawl 56, causes the contemporaneous rotation of the disk 50 and, therefore, via the cable 6a, the action of the rod 6, and thus of the injection pump. The said rod 6, since the seat 70 is closed and the pawl 56 can, therefore, slide over the whole circumferential surface of the third disk 52 (see FIG. 8), is free to effect its full travel in such a way, therefore, as to cause the injectors 3 to force into the combustion chamber, the required quantity of diesel oil, variable from the minimum to the maximum rating of the engine, with the maximum rating determined, as stated, by the rotating masses.

Figure 2:
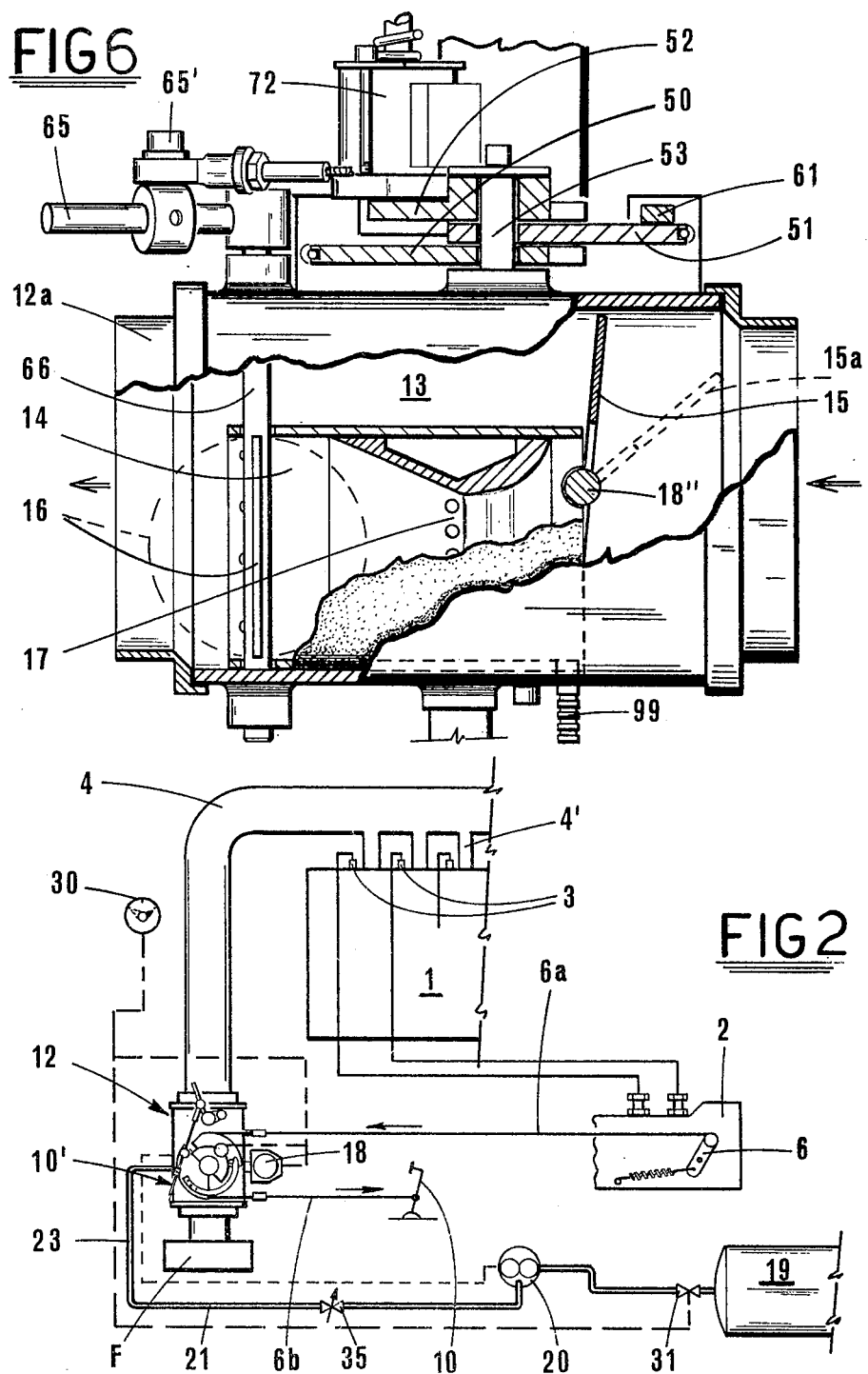
FIG. 2 shows, again in a diagrammatic view, the plant in question and one preferred embodiment for the mixer group.

Should, instead, it be wished to run the engine on a diesel oil-gas fuel mixture, all that has to be done is to alter the position of the cab switch 30, as can be seen in FIG. 2. First and foremost, with this changeover the electromagnet 72 that controls the opening of the seat 70 (that is to say the returning of its rod to the upper position) is energized or de-energized. Contemporaneously, the gas blocking valve 31 is made to open and the electromagnet 18 to be energized to place the throttle valve 15 in the position, as stated earlier on, whereby it is close to blocking.

This minimum opening position is determined by an adjusting screw 90 being moved flush up against the lateral surface of the control cam 18' of the throttle valve 15.

Naturally, the opening of the valve 31 to the reducer 20 is also brought about.

It is, therefore, in this condition that the control rod 6 is no longer able to fully complete its travel.

Thus when the control means of the accelerator 10 are moved, the rotation occurs, in the first travel section of the cable 6b, of the disk 51 and this, through the usual chain constituted by the end piece 61, the pawl 56 and the first disk 50, causes a pull to be applied to the cable 6a and, therefore, the injection pump 2 to operate. At this stage, despite the rotation of the disk 51, the valve 16 in the Venturi tube does not operate because of the predetermined distance D that exists between the two elements 63 and 68. This goes on until, after a preset run, the pawl 56 arrives in the region of the seat 70, into the inside of which it is thrust because of the special shape of the end piece 61 and the absence of the rod 71. At this precise moment, the pin 63 arrives flush up against the locking element 68 and thus the following condition arises:

the first disk 50 ceases its rotation since the pawl 56 remains locked between the third, fixed, disk 52 and the end piece 61 (see FIG. 7) and the travel of the rod 6 is, in this way, interrupted.

If the control means of the accelerator 10 continue to be moved, the disk 51, and this alone, carries on rotating and then moves the control rod 65 of the throttle valve 16, thus causing this to angle progressively and the quantity of gas drawn in through the pipe 23 to vary.

As seen, the injection pump operation stop is provided by the seat 70, the position of which can be set by suitably positioning the third disk 52 around the spindle 53.

Likewise, the commencement of the operation of the throttle valve 16 is regulated by the position of the blocking element 68.

The function of the leverage 65, that is to say the point 65' at which the cable 64 is connected thereto, can be so varied as to correlate the variation law of the valve 16 to the various travel exigencies of the accelerator control means depending on the particular engine to which the said plant is to be fitted, especially in the case of heavy vehicles.

One last observation concerns the pipe 99 (see FIG. 3): this runs from the pipe 14 upstream of the Venturi tube and is connected to the pressure reducer 20 in the region of the first chamber that is opposite the second gas containing chamber that constitutes the final reduction stage; the first chamber is customarily in direct contact with the atmosphere and constitutes the comparison value of the pressure reducer. Through this connection it is wished to maintain, inside the said first chamber, the same pressure value found immediately upstream of the Venturi tube which is liable to undergo variations as a function of the load losses that occur or that may occur upstream of the pipe 14, such as, for example, clogging of the filter etcetera.

In this way, when the pressure, and therefore the flow rate of the gas entering the Venturi tube, are constantly correlated to the actual requirements of the engine, thus independently of the load losses existing along the supply pipe which, in the conventional form of connection, would offset the stoichiometric ratio of the air-gas mixture entering the engine, it is possible to construct a mixing device that can be easily mounted on conventional diesel cycle engines without the need to make any modifications to the original plant, which can continue to operate normally in case of need. As regards the construction of the section of the pipe 14 at which the Venturi tube 17 is located, this should preferably not be in one piece with the said pipe 4 but be separate from this so that it be possible to replace or interchange the various Venturi tubes 17 to suit the fitting of the complete mixer group 12 to the various types of engines in existence that have quite different characteristics.

In the described embodiment, the gas utilized is preferably methane because of its very high antiknock value, since it is necessary that the air-gas mixture delivered to the inside of the cylinders, and there compressed, does not undergo self-ignition prior to the diesel oil injection stage. In case of need, any other form of gas, such as, for example, liquefied petroleum gas, may be used, with the supply mixed suitably so as to augment its antiknock value.

The invention can adopt, in its practical form of embodiment, also forms that differ from what has been outlined above and, in particular, numerous modifications of a practical nature may be introduced without, because of this, there being any deviation from the framework of protection afforded to the invention.

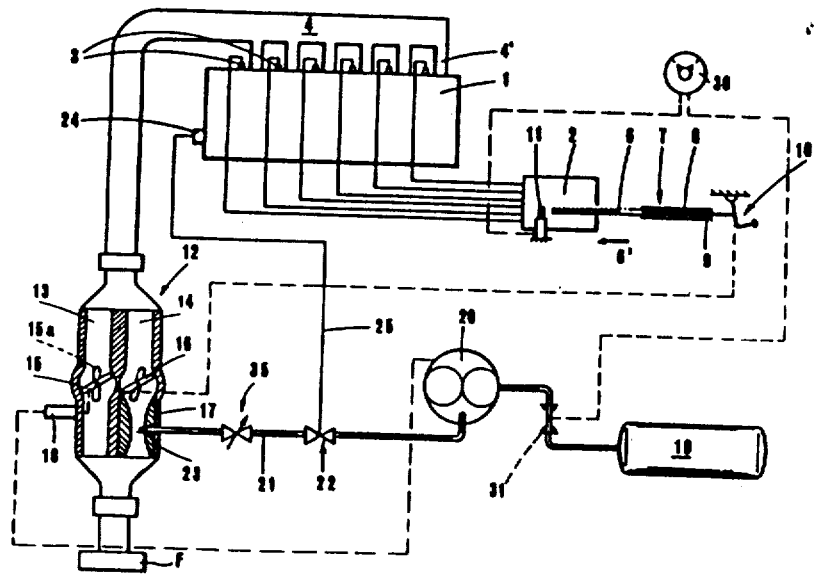

What is claimed is:

1. A plant for supplying diesel cycle engines with diesel fuel or a mixture of diesel and gaseous fuel comprising a device for interrupting the travel of an injection pump control lever, the control lever being connected to an accelerator, a mixer group placed on a manifold for the induction of air to the engine, the mixer comprising two parallel pipes, the first pipe being provided with a first throttle valve movable between an open and closed position, the second tube having a Venturi tube connected to a supply of gaseous fuel and a second throttle valve movable continuously and connected to the accelerator, the pipes being jointly provided with an air passage area at least identical to that required for maximum engine air induction, the first throttle valve being controlled by an actuator independently of the second throttle, the first throttle being in the fully open position and the second throttle in the closed position when the engine is to run solely on diesel fuel and the first throttle is in a closed position when the engine is to run on a mixture of diesel and gaseous fuel, the second throttle controlling the engine speed by incremental opening of the valve.

2. An internal combustion engine of the compression ignition type using diesel fuel or a mixture of diesel and gaseous fuel comprising,
a pump for injecting diesel fuel to the combustion chambers of the engine having a means for interrupting the travel of the pumps control lever, the lever being connected to an accelerator,
a mixer situated on a manifold for induction of air to the engine,
the mixer comprising a first pipe having a first throttle valve capable of closing the first pipe and a second pipe within the first pipe concentric thereto and having a Venturi tube and a second throttle valve capable of closing the second pipe, a first and second disk rotatably mounted on a spindle in two distinct planes, the first disk connected by an intermediate means to the control lever of the injection pump, the second disk connected to the accelerator and to the second throttle valve by a second intermediate means, the first disk provided with a pawl projecting from the plane of the disk and capable of axial displacement, a protrusion integral with the second disk engaging the pawl whereby rotation of the second disk causes rotation of the first disk, a third disk fixed to the spindle such that the pawl continuously contacts the perimeter thereof, the third disk provided with a seat to receive the pawl to inhibit rotation of the first disk, and a means for opening and closing said seat.

3. Plant according to claim 1, comprising a device for detecting the number of revolutions effected by the driving shaft, the output of which is connected to a valve in the gas supply pipe, the said device being designed to interrupt, through the said valve, the supply of gas once the driving shaft has completed a predetermined number of revolutions.

4. Plant according to claim 1, wherein the said first throttle valve is subjected to the action of a piston connected to the gas low pressure chamber inside the reducer, at the time when the said valve is in its extreme open position.

5. Plant according to claim 1, wherein the said Venturi tube is secured to the said second pipe by means of suitable removable fixing means to allow the said tube to be replaced.

6. Plant according to claim 1, wherein the said control rod of the injection pump is connected to the control means of the accelerator through the interposition of an elastic element that gives when the rod hits against the stop device.

7. Plant according to claim 1, wherein the said extreme closed position of the said first throttle valve defines sufficient an air passage for the slow running supply of the engine when the supply is effected solely with diesel oil.

8. Group according to claim 2, wherein the said first quarter moon shaped throttle valve is integral with a shaft keyed onto a cam movable in rotation by an electromagnet, adjustment means being provided, integral with the external tubular body, that go flush up against the outer surface of the said cam and are designed to regulate the closing position of the said valve.

9. Group according to claim 2, wherein the said means for opening and closing the said seat are constituted by the rod of an electromagnet integral with the upper part of the said third disk and movable perpendicularly to this.

10. Group according to claim 2, wherein the said first intermediate means are constituted by flexible cables fixed to the said first and second disk, respectively, guided and contained in corresponding grooves machined into the external circumferential surface of the corresponding disks.

11. Group according to claim 2, wherein the said second intermediate means are constituted by a pin fixed to and protruding from the upper part of the said second disk, with which is integral a tie that, through intermediate leverage, moves the support shaft of the second throttle valve of the Venturi tube, elastic return means that move the said shaft being provided.

12. Group according to claim 11, wherein the said pin is radially provided with a hole inside which the tie passes, the latter having a sleeve that can be positioned and locked thereto, in the non-operative condition of the accelerator control means, at a distance such as to suit the travel of the control rod of the injection pump.

13. Group according to claim 2, wherein the said projection is of coaxial circular sector conformation and extends in a plane parallel to that of the said disks, externally to the said third disk at a distance less than the gage of the said pawl, measured in a radial direction, the said projection being provided, in the region of its free extremity and of the part turned towards the center of rotation, with a recess designed to receive the said pawl partially restrained therein.

14. Group according to claim 2, wherein the said pipe is, upstream of the Venturi tube, provided with an outgoing pipe connected to the pressure reducer in the region of the first chamber that is opposite the second chamber containing gas and constituting the final reduction stage.

* * * * *

UNITED STATES PATENT AND TRADEMARK OFFICE
CERTIFICATE OF CORRECTION

PATENT NO. : 4,476,827

DATED : October 16, 1984

INVENTOR(S) : Rubens Basaglia and Ezio Bollina

It is certified that error appears in the above-identified patent and that said Letters Patent is hereby corrected as shown below:

The identity of the assignee should read as follows:

--B & B BOLOGNA di BASAGLIA Rubens e BOLLINA Ezio s.n.c. --

The title page should be deleted to appear as per attached title page.

Signed and Sealed this

Seventh Day of January 1986

[SEAL]

Attest:

Attesting Officer

DONALD J. QUIGG

Commissioner of Patents and Trademarks

United States Patent [19]

Basaglia et al.

[11] Patent Number: 4,476,827
[45] Date of Patent: Oct. 16, 1984

[54] PLANT FOR SUPPLYING DIESEL CYCLE ENGINES WITH DIESEL OIL AND WITH A MIXTURE OF DIESEL OIL AND GAS

[75] Inventors: Rubens Basaglia, Galliera; Ezio Bollina, Bologna, both of Italy

[73] Assignee: B & b Bologna di Basaglia Rubens e Bollina Ezio s.n.c., Bologna, Italy

[21] Appl. No.: 459,965

[22] Filed: Jan. 21, 1983

[30] Foreign Application Priority Data

May 20, 1982 [IT] Italy .................... 3249 A/82
Oct. 15, 1982 [IT] Italy .................... 3561 A/82

[51] Int. Cl.³ .................................................. F02B 3/00
[52] U.S. Cl. .................... 123/276; 123/525; 123/526
[58] Field of Search .............. 123/525, 526, 276 E

[56] References Cited

U.S. PATENT DOCUMENTS

| | | | |
|---|---|---|---|
| 2,315,882 | 4/1943 | Trimble et al. | 123/525 |
| 2,544,978 | 3/1951 | Blessing et al. | 123/526 |
| 2,569,002 | 9/1951 | Holloway et al. | 123/526 |
| 2,690,167 | 9/1954 | Moulton | 123/526 |
| 2,865,164 | 12/1958 | Kauffmann | 123/27 GE |
| 2,895,462 | 7/1959 | Champ | 123/525 |
| 2,987,055 | 6/1961 | Grauel et al. | 123/27 GE |
| 3,718,000 | 2/1973 | Walker | 123/525 |
| 4,125,091 | 11/1978 | Hori | 123/525 |

FOREIGN PATENT DOCUMENTS

| | | | |
|---|---|---|---|
| 960643 | 4/1950 | France | 123/526 |
| 170906 | 3/1960 | Sweden | 123/526 |
| 918483 | 4/1982 | U.S.S.R. | 123/525 |

*Primary Examiner*—Donald B. Cox
*Attorney, Agent, or Firm*—Cushman, Darby & Cushman

[57] ABSTRACT

Disclosed herein is a plant that supplies a diesel oil-gas fuel mixture to diesel cycle engines and comprises: a device for interrupting the travel of the lever that controls the injection pump and is connected to the accelerator; and a mixer group placed along the manifold for the induction of air to the cylinders, comprising two separate parallel pipes, the first of which provided with a first throttle valve movable between two extreme positions, namely a position for opening the air passage when the engine is running on diesel oil and a position for closing the air passage when the engine is running on a mixture of diesel oil and gas, and the second of which provided with a Venturi tube and with a second throttle valve for blocking the air passage, movable continuously and connected to the accelerator, the said Venturi tube being connected to a pipe for the supply of the gas at low pressure; the said pipes being jointly provided with an air passage area at least identical to that required for maximum engine air induction.

14 Claims, 8 Drawing Figures